July 17, 1962 R. W. WULLENWABER ET AL 3,044,528

MACHINE FOR STRAIGHTENING COMPONENT LEADS

Filed April 4, 1960 2 Sheets-Sheet 1

INVENTORS
ROBERT W. WULLENWABER
RALPH OTHON
BY
ATTORNEYS

MACHINE FOR STRAIGHTENING COMPONENT LEADS

Filed April 4, 1960 2 Sheets-Sheet 2

INVENTORS
ROBERT W. WULLENWABER
RALPH OTHON
BY
ATTORNEYS

United States Patent Office 3,044,528
Patented July 17, 1962

3,044,528

MACHINE FOR STRAIGHTENING COMPONENT LEADS

Robert W. Wullenwaber, Rolling Hills, and Ralph Othon, Los Angeles, Calif., assignors to Pacific Semiconductors, Inc., Culver City, Calif., a corporation of Delaware Filed Apr. 4, 1960, Ser. No. 19,608
7 Claims. (Cl. 153—32)

This invention relates to apparatus for operating on slender wire-like articles, and more particularly to an apparatus for straightening wire leads of electrical components and the like.

Various types of apparatus have been devised to straighten the leads of electrical components. However, these prior art devices generally suffer from one or more of several inherent disadvantages. Some devices are capable of straightening only relatively slight lead deformations and cannot properly straighten out sharp bends or kinks. Some devices subject the electrical leads to considerable pulling or torsional forces which are transmitted to the component body. Other devices apply a rotational force directly to the component body, usually utilizing a relatively complex machine having coaxial cylinders driven at different rotational speeds and requiring careful synchronization of machine operations to prevent a resultant force differential between the body and leads. In some devices the component feed rate is limited by the construction of the machine in that the component leads are engaged by peripheral slots in rotating discs. Most prior art devices are capable of straightening only the leads of components having regular cylindrical bodies with the leads aligned on a central axis. The apparatus of the present invention possesses none of the aforementioned disadvantages while utilizing relatively simple principles of operation and construction.

It is therefore an object of the present invention to provide a relatively simple and efficient lead straightening machine.

Another object of the present invention is to provide a lead straightening machine capable of straightening leads which are quite severely deformed.

A further object of the present invention is to provide a lead straightening machine which does not subject the leads to excessive pulling or torsional forces.

A still further object of the present invention is to provide a lead straightening machine which exerts no force on the component bodies.

Yet another object of the present invention is to provide a lead straightening machine in which there is no significant transfer of forces to the component bodies.

A still further object of the present invention is to provide a lead straightening machine capable of straightening leads extending axially from irregularly shaped component bodies.

The novel features which are believed to be characteristic of the present invention both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

The principle of operation of the preferred embodiment of the present invention is to cyclically and intermittently grasp the component by the portions of the leads extending therefrom immediately adjacent to the body while simultaneously gradually forcing the outlying portions of the leads into alignment along the axis of rotation of the leads. These operations are accomplished by the use of a rotary, lead-engaging wheel operating in cooperation with a vibrating pressure member which rapidly vibrates in a plane perpendicular to the axis of rotation of the wheel. The components whose leads are to be straightened are fed onto the circumferential surface of the wheel where, as they travel in a circular arc, their leads are subjected to repeated hammerlike blows by gradually tapering surfaces of the vibrating pressure member. Since the wheel is rotating with respect to the vibrating pressure member, each time the leads are grasped between the wheel and the member the component is rotated.

Figures 1, 4, 5, 6:
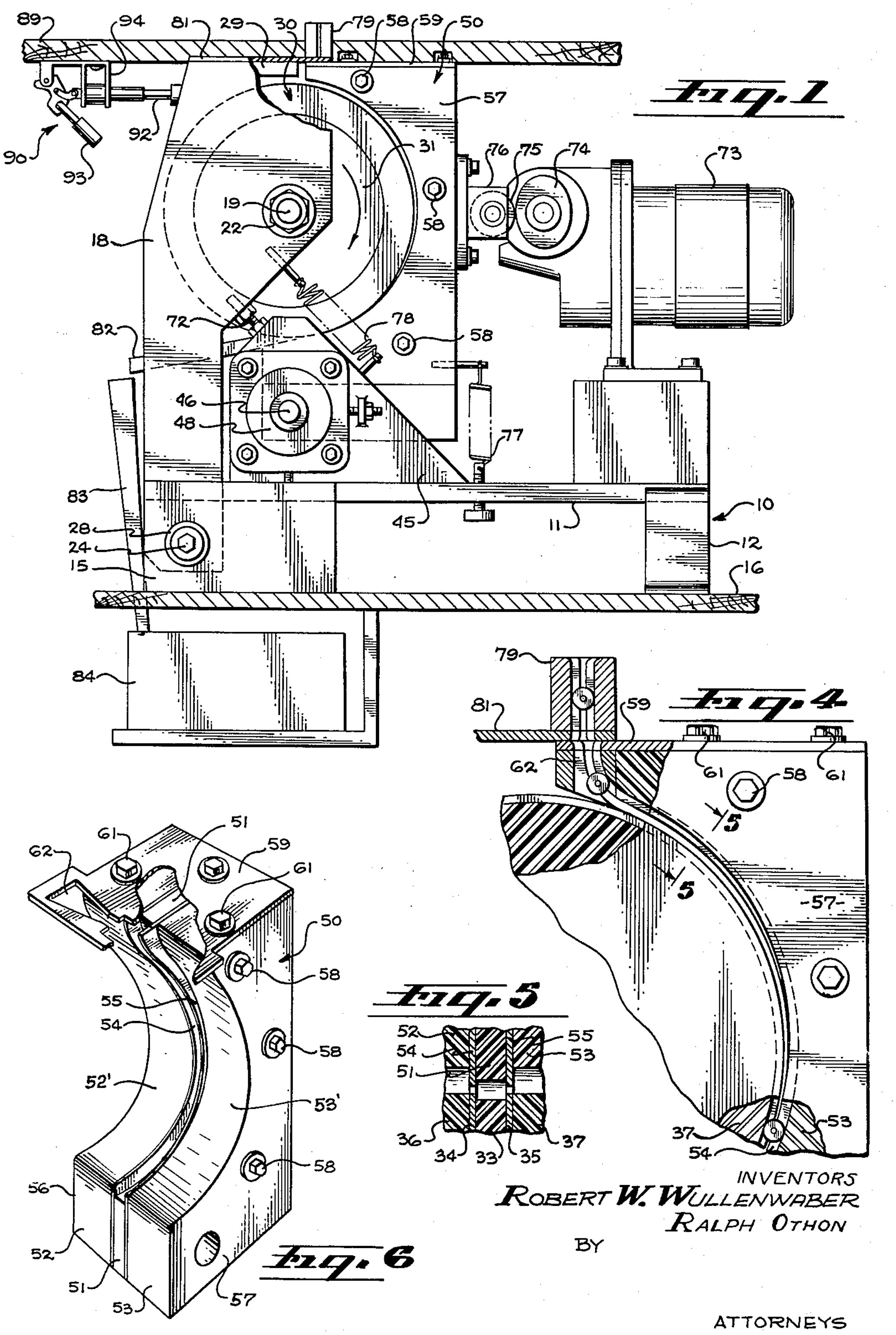
FIGURE 1 is an elevation view of a presently preferred embodiment of the apparatus of the present invention.
FIGURE 4 is an enlarged partial elevational view of the apparatus of FIGURE 1 showing in cross-sectional detail the passage of a component immediately upon introduction into the lead straightening device.
FIGURE 5 is a fragmentary cross-sectional view taken along line 5—5 of FIGURE 4.
FIGURE 6 shows the vibrating pressure member of the apparatus of FIGURE 1.
Figures 2, 3, 7:
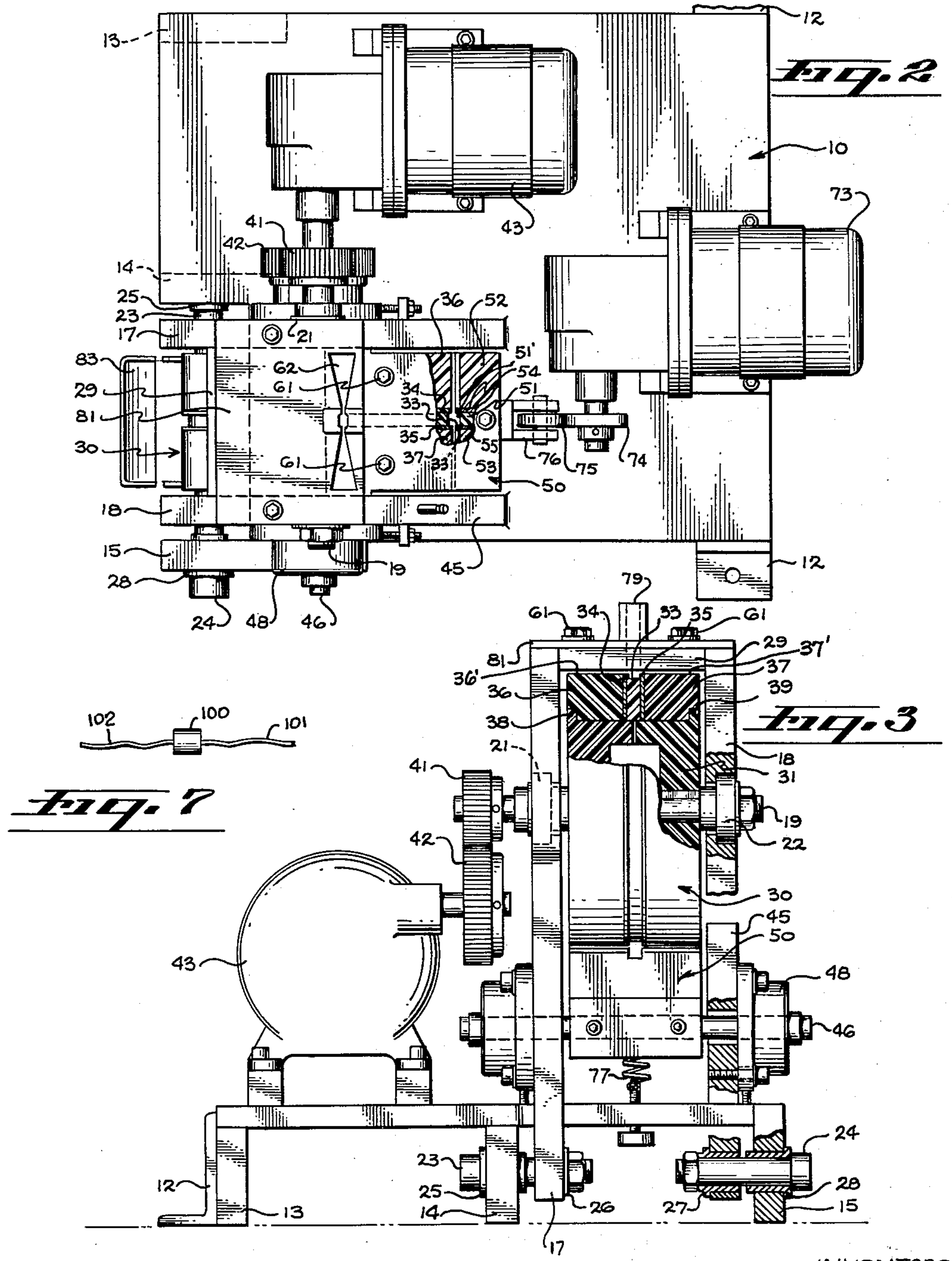
FIGURE 2 is a plan view of the apparatus shown in FIGURE 1.
FIGURE 3 is an end view of the apparatus of FIGURE 1.
FIGURE 7 shows a typical electrical component with bent leads before insertion into the apparatus of the present invention.

Referring now to FIGURES 1, 2 and 3, there are shown different views of a supporting base assembly 10, consisting of a base plate 11, mounting feet 12 and mounting blocks 13, 14 and 15, which serve to horizontally position the base plate 11 above support 16.

A lead-engaging wheel 30 is rotatably mounted between wheel support brackets 17 and 18 by means of an axle shaft 19 rotatably mounted in bearings 21 and 22. The wheel support brackets 17 and 18 extend upwardly from the base plate with a bottom portion extending beneath the base plate through rectangular slots therein. As shown particularly in FIGURE 3, the wheel support brackets 17 and 18 are in turn pivotally mounted at the lower portions thereof to mounting blocks 14 and 15 respectively, by means of shafts 23 and 24 respectively, turning in bearings 25, 26, 27 and 28 respectively. A spacer block 29 connects the upper ends of the brackets 17 and 18 to maintain the brackets in spaced-apart parallel relationship substantially perpendicular to the base plate.

The lead-engaging wheel 30 is a laminated structure built up on a circular core 31 of suitable rigid material which is fitted to axle shaft 19 and prevented from rotating with respect thereto by suitable means such as a key. An outer group of laminating rings is fitted over the core 31 to form a lead-engaging circumferential surface. An inner, central laminating ring 33 has a width slightly greater than the length of the component bodies whose leads are to be straightened. The ring 33 is sandwiched between two identical metallic rings 34 and 35 having outside diameters greater than the outside diameter of ring 33 by a distance greater than the radial distance from the component wire leads to the outermost surface portion of the component bodies. Identical outer rings 36 and 37, having an outer diameter equal to that of the metallic rings 34 and 35 are positioned in abutment with rings 34 and 35 and hold the lamellar structure in position by fitting between shoulders 38 and 39 protruding from the outermost portions of core 31. Thus, there is formed on wheel 30 a circumferential surface having a central channel to accommodate the component bodies, the remainder of the circumferential surface being flat to engage the component leads. The total width of the circumferential surface is at least as great as the length of the components with their leads axially extended. The wheel 30 is driven through a ring gear 41 affixed to the shaft 19 and a mating gear 42 affixed to the shaft of a driving electrical motor 43 mounted to the base plate 11.

A pressure member 50 is pivotally mounted between identical bearing blocks 44 and 45 by means of a shaft 46 rotating in bearings 47 and 48. The bearings 47 and 48 are affixed to the blocks 44 and 45 at a position beneath the lead-engaging wheel 30 as more fully described hereinafter. The shaft 46 is positioned parallel to the shaft 19 of the lead engaging wheel 30. As can best be seen from FIGURE 6, the pressure member 50 is a laminated structure having a lamellar configuration identical to that of wheel 30. A central lamination 51 is separated from identical thick outer laminations 52 and 53 by identical thin inner plates 54 and 55 respectively. The lamellar structure is held together by metallic outer plates 56 and 57, the entire assembly being secured by fastening means such as countersunk bolts 58. Pressure member 50 has an irregular lead-straightening face mateable as defined hereinafter with the circumferential surface of the wheel 30 and is composed of edge surfaces of the laminations 51, 52, 53, and the plates 54 and 55, which have different radii and centers of curvature as described below. The edges of the thin inner plates 54 and 55 are circularly concave with a radius of curvature somewhat greater than the radius of the circumferential surface of the lead-engaging wheel 30 by an amount greater than the thickness of the leads 101 and 102 adjacent the body 100 of the device (FIGURE 7). The edge surface of the central lamination 51 is also circularly concave but depressed from the edge surfaces of the thin inner plates 54 and 55 to form a central channel similar to the circumferential channel in the wheel 30. Thus, with the pressure member 50 pivotally mounted as shown, the radius of curvature of the plates 54 and 55 has a center point at the shaft 19, when the pressure member 50 is in the position shown in FIGURE 1, and is slightly greater than the radius of the wheel 30. Similarly, the radius of curvature of the central lamination 51 also has its center point at the shaft 19 with a greater radius to define a channel parallel to the plates 54 and 55. The depth of the channel, and thus the amount by which the radius of the channel is greater than that of the plates, is somewhat greater than the radius of the device body 100. According, when the member 50 is in the co-operative position as shown in FIGURE 1, the body 100 of the device will be retained within the annulus defined by the oppositely disposed circumferential channels 33′ and 51′. The edge surfaces of the thick outer laminations 52 and 53 are concave in a smooth curve extending from a point even with the edge surface of the central lamination 51 to a point flush with the edge surfaces of the thin inner plates 54 and 55.

The smooth curve of the parallel lead engaging surfaces 52′ and 53′ of the outer laminations 52 and 53 are such that the surfaces converge toward the surfaces 36′ and 37′ respectively of the wheel 30 in the clockwise direction. Specifically, at the upper end of the lead engaging surfaces 52′ and 53′ in the orientation of FIGURE 1, a space exists between the surfaces 52′ and 53′ and the circumferential surfaces 36′ and 37′ which is substantially greater than the diameter of the leads to be straightened. The surfaces then converge in a smooth surface such that at, or before the lower end thereof they are spaced apart only by a distance equal to the diameter of the leads. Accordingly, toward the upper end of the pressure member 50 a device with leads severely bent or kinked will pass into the space between the surfaces 36′—37′ and 52′—53′ but at a direction clockwise therefrom only leads which are substantially straight will pass between the surfaces.

A top plate 59 is secured to the upper surface of the pressure member 50 by bolts 61. Near the end of the top plate 59 nearest the lead-engaging face of the pressure member 50 is a feed slot 62, through which the components are fed to have their leads straightened. The feed slot 62 is oriented parallel to the axis of the wheel 30 at the circumference thereof and is so constructed as to align the body of the device with the annular channel extending between the central lamination 51 of the pressure member 50 and the central ring of the wheel 30. For example, the feed slot 62 has a central opening aligned with the annular channel which opening is of approximately equal configuration to the transverse cross-section of the body. Lead openings extend from each side of the body opening and are of lesser width adjacent the body opening to allow passage of the leads therethrough while preventing passage of the body except through the body opening. Thus, the lead openings are greater in length than the leads and are preferably divergent outwardly from the body openings to allow passage of leads with a severe deformation.

Although many suitable materials can be used for the present invention, excellent results have been achieved by utilizing nylon to form the various device contact or lead contact surfaces. That is, the lamination 51, the plates 53 and 54, and the rings 33, 36 and 37 are formed from nylon.

Referring now to FIGURES 1, 2 and 3, it can be seen how pressure member 50 is mounted to co-operate with the circumferential surface of the lead-engaging wheel 30. The operating position of wheel 30 is adjustably determinable by means of bolts 71 (not shown) and 72 threaded into the wheel support brackets 17 and 18 respectively, and having their heads abutted against bearing blocks 44 and 45 respectively by the gravitational force resulting from the weight of wheel 30. The pressure member 50 is sustained in a substantially vertical position by an electrical drive motor 73 mounted on the base plate 11, the drive motor 73 having a slightly eccentric drive wheel 74 contacting an idler wheel 75 supported by a yoke 76 mounted on the pressure member 50. When the electric drive motor 73 is in operation the eccentric drive wheel 74 rotates in frictional contact with the idler wheel 75, thereby causing vibration of pressure member 50 about a pivot point corresponding with the axis of the shaft 46. The vibrations are damped by a coil spring 77 fastened between the pressure member 50 and the base plate 11. The pressure member 50 is in alignment with the wheel 30, with the channels in each of these co-operating parts facing each other. A heavy spring 78, mounted between wheel support bracket 18 and bearing block 45 serves to limit and damp any oscillatory vibration of the wheel 30. In normal operation both the motors 43 and 73 are energized and the wheel 30 rotates in a clockwise direction, as shown in FIGURE 1, while pressure member 50 vibrates in a plane perpendicular to the axis of rotation of the wheel 30 and at a frequency greater than the speed of rotation of the wheel 30.

Referring now to FIGURES 4 and 5, it can be seen how electrical components are fed into the device and how they pass through the device. The components are fed into a positioning jig 79, mounted on a cover plate 81 secured to the spacer block 29. A slot in the jig 79 is positioned over the central portion of the slot 62 in the top plate 59 of the pressure member 50. The body of an electrical component whose leads are to be straightened is dropped into the jig 79, passes through the slot 62 in the top plate 59 and falls down between the circumferential surface of the wheel 30 and the lead-engaging face of the pressure member 50, where it is supported by its leads by the circumferential surface of the wheel 30 and with its body accommodated in the circumferential channel of the wheel 30. The rotation of wheel 30 carries the component around in a clockwise direction along the circumference of the wheel 30 where the component leads are repeatedly subjected to hammer-like blows by the lead-engaging face of the vibrating pressure member 50. As the lead-engaging surfaces 52′—53′ of the pressure member 50 closely approach the circumferential surface of the wheel 30, these edge surfaces of thick outer laminations 52 and 53 force the leads closer to the axis of rotation of the leads. (Note that the relative rotary motion of the circumferential surface of the wheel 30 with respect to the edge surfaces of laminations 54 and 55 causes rotation of the leads, and hence of the component.) Thus, as a result of the rotation of wheel 30 and the vibration of pressure member 50, the component leads are cyclically, intermittently and are simultaneously gradually hammered into alignment along the axis of rotation of the leads by the tapering edge surfaces 52′ and 53′ of thick outer laminations 52 and 53 of the pressure member 50 as the component passes through the machine. Upon passage through the machine the component can be conducted to a trough 82 (see FIGURE 1) and thence down a channel 83 to a storage bin 84. Note that in passing through the machine the component has been grasped and rotated only by the leads, the body having been accommodated by the channels in the wheel 30 and the pressure member 50. Therefore, the device of the present invention can be utilized to straighten the axially extending leads of components having irregularly shaped bodies.

Figure 8:
FIGURE 8 shows the electrical component of FIGURE 7 upon removal from the apparatus of the present invention after having its leads straightened.

FIGURE 7 shows an electrical component having deformed leads and FIGURE 8 shows the electrical component of FIGURE 7 after having its leads straightened by the device of the present invention.

Thus, there has been described a preferred embodiment of the device of the present invention. Although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. A machine for straightening elongated wire leads extending axially from opposite ends of component bodies comprising, in combination: a rotary lead-engaging wheel having a central circumferential channel therein to freely accommodate component bodies while only the leads thereof are engaged by the remaining portions of the circumferential surface of the wheel, said remaining portions of the circumferential surface of said wheel being smooth; a pressure member disposed for co-operation with said lead-engaging wheel and adapted to present a longitudinally sectioned lead-engaging face for co-operation with the circumferential surface of said lead-engaging wheel; and means for vibrating said pressure member at a frequency greater than the speed of rotation of said lead-engaging wheel and in a plane perpendicular to the axis of rotation of said wheel, each longitudinal section of the lead-engaging face of said pressure member being of such longitudinally concave curvature to facilitate, in operational co-operation with the circumferential surface of said lead-engaging wheel, free accommodation of the bodies of the components fed into said machine and cyclical intermittent rotation of the component leads while simultaneously gradually forcing the leads into alignment along the axis of rotation of said leads.

2. A machine for straightening elongated wire leads extending axially from opposite ends of component bodies comprising, in combination: a rotary lead-engaging wheel having a flat circumferential surface with a central circumferential channel therein to freely accommodate component bodies while only their leads are engaged by the remainder of the circumferential surface; a laminated pressure member disposed for co-operation with said lead-engaging wheel and adapted to present a laminated lead-engaging face for co-operation with the circumferential surface of said lead-engaging wheel; and means for vibrating said pressure member at a frequency greater than the speed of rotation of said lead-engaging wheel and in a plane perpendicular to the axis of rotation of said wheel, the edge surfaces of the laminations comprising said lead-engaging face being longitudinally concave and of such respective curvatures to facilitate, in operational co-operation with the circumferential surface of said lead-engaging wheel, free accommodation of the bodies of the components fed into said machine and cylical intermittent rotation of the component leads while simultaneously gradually forcing the leads into alignment along the axis of rotation of said leads.

3. A machine for straightening elongated wire leads extending axially from opposite ends of component bodies comprising, in combination: a rotary lead-engaging wheel having a laminated flat circumferential surface with a central circumferential channel therein to freely accommodate component bodies while only their leads are engaged by the remaining flat portion of the circumferential surface, said circumferential channel being formed by a central lamination having a thickness slightly greater than the length of said component body and a radius substantially less than the radius of said circumferential surface, the depth of said channel being greater than the radial distance from the wire lead to the outermost surface portion of said component body, the remaining outlying portions of said circumferential surface being formed of identical thick laminations, the total laminar thickness of the circumferential surface of said lead-engaging wheel being at least as great as the length of said components with their leads axially extended; a laminated pressure member disposed for co-operation with said lead-engaging wheel and adapted to present a laminated lead-engaging face for co-operation with the laminated circumferential surface of said lead-engaging wheel; and means for vibrating said pressure member at a frequency greater than the speed of rotation of said lead-engaging wheel and in a plane perpendicular to the axis of rotation of said wheel, said lead-engaging face having a laminar structure identical to the laminar structure of the circumferential surface of said lead-engaging wheel, the edge surface of the laminations comprising said lead-engaging face being longitudinally concave and of such respective curvatures to facilitate, in operational co-operation with the circumferential surface of said lead-engaging wheel, free accommodation of the bodies of the components fed into said machine and cyclical intermittent rotation of said leads while simultaneously gradually forcing said leads into alignment along the axis of rotation of said leads.

4. A machine for straightening elongated wire leads extending axially from opposite ends of component bodies comprising, in combination: a vertically rotating lead-engaging wheel having a central circumferential channel therein to freely accommodate successive component bodies while only their leads are engaged by the remainder of the circumferential surface of the wheel, said remainder of the circumferential surface of said wheel being smooth; a laminated pressure member having a total laminar thickness substantially equal to the circumferential thickness of said wheel, said member having a central lamination equal in thickness to the width of the circumferential channel in said wheel and separated from identical thick outer laminations by identical thin inner laminations, said pressure member having an irregular lead-engaging face composed of edge surfaces of said laminations and in which the edge surfaces of said thin inner laminations are circularly concave to fit the circular curvature of the circumferential surface of said wheel, the edge surface of said central lamination being circularly concave and depressed from the edge surfaces of said inner laminations to thereby define a central channel having essentially the same depth as the circumferential channel in said wheel, and the edge surfaces of said thick outer laminations being concave in a smooth curve extending from a point even with the edge surface of said central lamination to a point flush with the edge surfaces of said thin inner laminations, said pressure member being vertically disposed for co-operation with the circumferential surface of said wheel and with the channel in the face of said wheel and in alignment therewith and with the end of said face having the outer edge surfaces of the thick outer laminations even with the edge surface of said central lamination being uppermost and with the taper of said thick outer lamination convergently extending in the direction of rotation of said lead-engaging wheel; and means for vibrating said pressure member in a plane perpendicular to the axis of rotation of said lead-engaging wheel and about a pivot point located at the lowermost end of said pressure member, the frequency of vibration of said pressure member being greater than the speed of rotation of said lead-engaging wheel.

5. A machine for straightening elongated wired leads extending axially from opposite ends of component bodies comprising, in combination; a rotary lead-engaging wheel having a laminated flat circumferential surface with a central circumferential channel therein to freely accommodate component bodies while only their leads are engaged by the remaining flat portions of the circumferential surface, said circumferential channel being formed by a central lamination having a thickness slightly greater than the length of said component bodies and two identical thin laminations forming the side walls of said channel, the depth of said channel being greater than the radial distance from the wire leads to the outermost surface portion of said component bodies, the remaining outlying portions of said circumferential surface being formed of identical thick laminations flush with said thin laminations to form a smooth surface, the total laminar thickness of the circumferential surface of said lead-engaging wheel being at least as great as the length of said components with their leads axially extended; a laminated pressure member with a lead-engaging face having a laminar structure identical with the laminar structure of the circumferential surface of said lead-engaging wheel, said lead-engaging face being composed of edge surfaces of said laminations and in which the edge surfaces of the thin laminations are circularly concave to fit the circular curvature of the circumferential surface of said wheel, the edge surface of the central lamination being circularly concave and depressed from the edge surfaces of the thin laminations to thereby define a central channel having essentially the same depth as the circumferential channel in said wheel, and the edge surfaces of the thick outer laminations being concave in a smooth curve extending from a point even with the edge surface of said central lamination to a point flush with the edge surfaces of said thin laminations, said pressure member being vertically disposed for co-operation with the circumferential surface of said wheel and with the channel in the face of said member facing the channel in the circumferential surface of said wheel and in alignment therewith and with the end of said face having the outer edge surfaces of the thick outer laminations even with the edge surface of said central lamination being uppermost and with the taper of said thick outer laminations convergently extending in the direction of said rotation of said lead-engaging wheel; and means for vibrating said pressure member in a plane perpendicular to the axis of rotation of said lead-engaging wheel and about a pivot point located at the lowermost end of said pressure member, the frequency of vibration of said pressure member being greater than the speed of rotation of said lead-engaging wheel.

6. Apparatus for straightening electrical component leads, said leads stiffly extending from opposed ends of the component body, said apparatus comprising: a first member having a lead engaging smooth surface adapted to supportably contact said electrical component only at the leads thereof, said first member being adapted for movement of said lead engaging surface in a predetermined path; means coupled to said first member for causing movement of said lead engaging surface along said predetermined path; a generally elongate second member having a longitudinally tapered lead straightening surface adapted for movement toward and away from the lead engaging surface of said first member as it moves along a predetermined portion of said predetermined path, the longitudinal taper of said lead engaging face being convergent toward said lead engaging surface along said pretermined path, said lead straightening surface being adapted to contact only the leads of an electrical component supportably contacted by said lead engaging surface; and, means for moving said lead straightening surface of said second member cyclically toward and away from said lead contacting surface of said first member at a relatively high frequency with respect to the rate of movement of said lead engaging surface, the movement of said lead straightening surface toward said lead engaging surface being sufficient to firmly grasp the leads of electrical components between said surfaces to thereby cause intermittent cyclical rotation of said component by its leads while simultaneously gradually forcing the leads into axial alignment as the component moves across the tapered surface of said lead straightening member.

7. Apparatus for straightening electrical component leads, said leads stiffly extending from opposed ends of the component body, said apparatus comprising:

a rotary member having a peripheral lead engaging surface adapted to supportably contact said electrical component only at the leads thereof; means coupled to said rotary member to cause the rotation thereof; a generally elongate impacting member having a longitudinally concave tapered lead straightening surface adapted for movement toward and away from the lead engaging surface of said rotary member in a plane perpendicular to the axis of rotation of said rotary member, the longitudinal taper of said lead engaging face being convergent toward said lead engaging surface along the direction of rotation of said rotary member, said lead straightening surface being adapted to contact only the leads of an electrical component supportably contacted by said lead engaging surface; and, vibratory means for moving said impacting member cyclically toward and away from the peripheral surface of said rotary member at a relatively high frequency with respect to the speed of rotation of said rotary member, the movement of said lead straightening surface toward said lead engaging surface being sufficient to firmly grasp the leads of said electrical component between said surfaces to thereby cause intermittent cyclical rotation of said component by its leads while simultaneously gradually forcing the leads into axial alignment as the component moves about the periphery of said rotary member.

References Cited in the file of this patent

UNITED STATES PATENTS

| | | |
|---|---|---|
| 2,858,873 | Snow | Nov. 4, 1958 |
| 2,860,686 | Frank et al. | Nov. 18, 1958 |
| 2,964,087 | Riese | Dec. 13, 1960 |